United States Patent
Ramsayer et al.

(10) Patent No.: US 8,711,707 B2
(45) Date of Patent: *Apr. 29, 2014

(54) INTEGRATING MULTIMEDIA CAPABILITIES WITH CIRCUIT-SWITCHED CALLS

(75) Inventors: Christopher G. Ramsayer, Apex, NC (US); William Clyde Prentice Dalrymple, Cary, NC (US); Philip John Campion, Apex, NC (US); Jeong Min Kim, Allen, TX (US); Ta-Ming Chen, Cary, NC (US)

(73) Assignee: Apple Inc., Cupertino, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/323,207

(22) Filed: Dec. 12, 2011

(65) Prior Publication Data
US 2012/0076002 A1 Mar. 29, 2012

Related U.S. Application Data

(63) Continuation of application No. 09/960,554, filed on Sep. 21, 2001, now Pat. No. 8,098,651.

(60) Provisional application No. 60/308,177, filed on Jul. 27, 2001.

(51) Int. Cl.
H04L 1/00 (2006.01)

(52) U.S. Cl.
USPC ........... 370/241; 370/315; 370/356; 370/351; 370/401; 370/410; 379/201.07

(58) Field of Classification Search
USPC ......... 370/315, 356, 401, 389, 351–355, 410; 379/201.07
See application file for complete search history.

(56) References Cited

U.S. PATENT DOCUMENTS

| 5,454,032 A | 9/1995 | Pinard et al. |
| 5,539,884 A | 7/1996 | Robrock, II |
| 5,604,737 A | 2/1997 | Iwami et al. |

(Continued)

FOREIGN PATENT DOCUMENTS

| EP | 0453128 A2 | 10/1991 |
| EP | 0721266 A2 | 7/1996 |

(Continued)

OTHER PUBLICATIONS

No Author, "H.245: Control Protocol for Multimedia Communication," May 1999, "Capability exchange,," 2 pages, XP-002199601.

(Continued)

*Primary Examiner* — Andrew Lai
*Assistant Examiner* — Andrew C Lee
(74) *Attorney, Agent, or Firm* — Meyertons, Hood, Kivlin, Kowert & Goetzel, P.C.

(57) ABSTRACT

The present invention monitors call signaling events stemming from a circuit-switched call between a caller and a called party and controls a packet-session between user agents on respective endpoints associated with the caller and called party. The endpoints may include any type of computational device capable of facilitating the packet-session over a packet-switched network. Control of the user agents may be provided via a proxy for the user agents and may use the session initiation protocol (SIP), or like session control protocol for communications.

34 Claims, 4 Drawing Sheets

(56) References Cited

U.S. PATENT DOCUMENTS

| | | | |
|---|---|---|---|
| 5,610,910 A * | 3/1997 | Focsaneanu et al. | 370/351 |
| 5,625,677 A * | 4/1997 | Feiertag et al. | 370/493 |
| 5,689,553 A | 11/1997 | Ahuja et al. | |
| 5,764,750 A | 6/1998 | Chau et al. | |
| 5,790,798 A | 8/1998 | Beckett, II et al. | |
| 5,809,128 A | 9/1998 | McMullin | |
| 5,881,145 A | 3/1999 | Giuhat et al. | |
| 5,884,032 A | 3/1999 | Bateman et al. | |
| 5,912,952 A | 6/1999 | Brendzel | |
| 5,946,386 A | 8/1999 | Rogers et al. | |
| 5,987,102 A | 11/1999 | Elliott et al. | |
| 6,011,843 A | 1/2000 | Hochman et al. | |
| 6,058,435 A | 5/2000 | Sassin et al. | |
| 6,061,347 A | 5/2000 | Hollatz et al. | |
| 6,137,869 A | 10/2000 | Voit et al. | |
| 6,196,846 B1 | 3/2001 | Berger et al. | |
| 6,215,865 B1 | 4/2001 | McCalmont | |
| 6,289,010 B1 | 9/2001 | Voit et al. | |
| 6,295,293 B1 | 9/2001 | Toennby et al. | |
| 6,320,857 B1 | 11/2001 | Tonnby et al. | |
| 6,373,817 B1 | 4/2002 | Kung et al. | |
| 6,404,746 B1 | 6/2002 | Cave et al. | |
| 6,424,657 B1 * | 7/2002 | Voit et al. | 370/412 |
| 6,430,174 B1 | 8/2002 | Jennings et al. | |
| 6,442,268 B1 | 8/2002 | Klaghofer et al. | |
| 6,449,260 B1 | 9/2002 | Sassin et al. | |
| 6,453,034 B1 | 9/2002 | Donovan et al. | |
| 6,459,787 B2 | 10/2002 | McIllwaine et al. | |
| 6,512,818 B1 | 1/2003 | Donovan et al. | |
| 6,515,996 B1 | 2/2003 | Toemmby et al. | |
| 6,539,077 B1 | 3/2003 | Ranalli et al. | |
| 6,584,093 B1 | 6/2003 | Salama et al. | |
| 6,594,254 B1 | 7/2003 | Kelly | |
| 6,594,357 B1 | 7/2003 | Emerson et al. | |
| 6,597,687 B1 | 7/2003 | Rao | |
| 6,600,819 B1 | 7/2003 | Catley et al. | |
| 6,614,781 B1 * | 9/2003 | Elliott et al. | 370/352 |
| 6,615,236 B2 | 9/2003 | Donovan et al. | |
| 6,625,141 B1 | 9/2003 | Glitho et al. | |
| 6,681,252 B1 * | 1/2004 | Schuster et al. | 709/227 |
| 6,690,407 B1 | 2/2004 | Parker et al. | |
| 6,693,662 B1 | 2/2004 | Parker et al. | |
| 6,693,897 B1 * | 2/2004 | Huang | 370/352 |
| 6,697,478 B1 | 2/2004 | Meldrum et al. | |
| 6,724,887 B1 | 4/2004 | Eilbacher et al. | |
| 6,731,625 B1 * | 5/2004 | Eastep et al. | 370/352 |
| 6,747,970 B1 | 6/2004 | Lamb et al. | |
| 6,754,693 B1 | 6/2004 | Roberts et al. | |
| 6,760,429 B1 | 7/2004 | Hung et al. | |
| 6,768,722 B1 | 7/2004 | Katseff et al. | |
| 6,771,639 B1 | 8/2004 | Holden | |
| 6,775,269 B1 | 8/2004 | Kaczmarczyk et al. | |
| 6,778,653 B1 | 8/2004 | Kallas et al. | |
| 6,795,444 B1 * | 9/2004 | Vo et al. | 370/401 |
| 6,822,957 B1 | 11/2004 | Schuster et al. | |
| 6,831,675 B2 | 12/2004 | Shachar et al. | |
| 6,857,021 B1 * | 2/2005 | Sidhu et al. | 709/227 |
| 6,865,681 B2 * | 3/2005 | Nuutinen | 726/14 |
| 6,870,848 B1 * | 3/2005 | Prokop | 370/395.2 |
| 6,914,897 B1 | 7/2005 | Schuster et al. | |
| 6,934,279 B1 * | 8/2005 | Sollee et al. | 370/352 |
| 6,937,563 B2 * | 8/2005 | Preston et al. | 370/230 |
| 6,937,699 B1 | 8/2005 | Schuster et al. | |
| 6,940,847 B1 * | 9/2005 | Glitho et al. | 370/352 |
| 6,944,150 B1 * | 9/2005 | McConnell et al. | 370/352 |
| 6,965,614 B1 * | 11/2005 | Osterhout et al. | 370/466 |
| 6,981,022 B2 | 12/2005 | Boundy | |
| 7,103,644 B1 * | 9/2006 | Zhang et al. | 709/219 |
| 7,110,525 B1 | 9/2006 | Heller et al. | |
| 7,123,700 B1 | 10/2006 | Weaver, III et al. | |
| 7,139,263 B2 | 11/2006 | Miller et al. | |
| 7,164,913 B1 * | 1/2007 | Dantu et al. | 455/436 |
| 7,184,526 B1 | 2/2007 | Cook | |
| 7,197,560 B2 | 3/2007 | Caslin et al. | |
| 7,218,722 B1 | 5/2007 | Turner et al. | |
| 7,283,969 B1 * | 10/2007 | Marsico et al. | 705/346 |
| 7,571,238 B1 * | 8/2009 | Reeves et al. | 709/229 |
| 2001/0038624 A1 * | 11/2001 | Greenberg et al. | 370/352 |
| 2002/0064149 A1 * | 5/2002 | Elliott et al. | 370/352 |
| 2002/0075881 A1 * | 6/2002 | Yoakum et al. | 370/410 |
| 2002/0118675 A1 | 8/2002 | Strathmeyer et al. | |
| 2002/0176404 A1 | 11/2002 | Girard | |
| 2002/0191635 A1 * | 12/2002 | Chow et al. | 370/463 |
| 2003/0063590 A1 | 4/2003 | Mohan et al. | |
| 2003/0076815 A1 | 4/2003 | Miller et al. | |
| 2003/0076819 A1 | 4/2003 | Emerson | |
| 2003/0126205 A1 | 7/2003 | Lurie | |
| 2003/0185232 A1 | 10/2003 | Moore et al. | |
| 2003/0214958 A1 | 11/2003 | Madour et al. | |
| 2004/0001501 A1 | 1/2004 | Delveaux et al. | |
| 2006/0098619 A1 * | 5/2006 | Nix et al. | 370/352 |
| 2007/0110043 A1 | 5/2007 | Girard | |

FOREIGN PATENT DOCUMENTS

| | | |
|---|---|---|
| EP | 0999712 A2 | 5/2000 |
| EP | 1091548 A2 | 4/2001 |
| EP | 1148688 A1 | 10/2001 |
| WO | 9844703 A1 | 10/1998 |
| WO | 0115423 A1 | 3/2001 |
| WO | 0169883 A2 | 9/2001 |
| WO | 0211411 A1 | 2/2002 |

OTHER PUBLICATIONS

Thom, Gary, "H.323: The Multimedia Communications Standard for Local Area Networks," Dec. 1996, IEEE Communications Magazine, vol. 34 No. 12, pp. 52-56, XP 00063645Byte.com.

McGoogan, J. et al., "Evoluation of Switching Architecture to Support Voice Telephony over ATM," Apr.-Jun. 2000, Bell Labs, Tech. J., vol. 5 Issue 5, pp. 157-168.

International Search Report for PCT/IB02/04939 mailed Mar. 18, 2003, 8 pages.

International Search Report for PCT/IB03/04263 mailed Feb. 16, 2004, 7 pages.

International Search Report for PCT/IB03/04269 mailed Feb. 3, 2004, 7 pages.

International Search Report for PCT/IB03/04276 mailed Jan. 21, 2004, 4 pages.

No Author, "Byte.com," obtained Dec. 11, 2007, 3 pages, http://www.byte.com/art/9801 1sec5/art24.htm.

Advisory Action for U.S. Appl. No. 09/960,554 mailed Aug. 18, 2006, 3 pages.

Decision on Appeal for U.S. Appl. No. 09/960,554 mailed Apr. 25, 2011, 7 pages.

Examiner's Answer to Appeal Brief for U.S. Appl. No. 09/960,554 mailed Oct. 28, 2008, 29 pages.

Final Office Action for U.S. Appl. No. 09/960,554 mailed Mar. 17, 2008, 28 pages.

Final Office Action for U.S. Appl. No. 09/960,554 mailed May 26, 2006, 16 pagse.

Non-final Office Action for U.S. Appl. No. 09/960,554 mailed Apr. 12, 2007, 26 pages.

Non-final Office Action for U.S. Appl. No. 09/960,554 mailed May 17, 2005, 10 pages.

Non-final Office Action for U.S. Appl. No. 09/960,554 mailed Nov. 14, 2005, 12 pages.

Non-final Office Action for U.S. Appl. No. 09/960,554 mailed Oct. 3, 2007, 26 pages.

Notice of Allowance for U.S. Appl. No. 09/960,554 mailed Jun. 1, 2011, 8 pages.

Notice of Allowance for U.S. Appl. No. 09/960,554 mailed Sep. 8, 2011, 7 pages.

* cited by examiner

INTEGRATING MULTIMEDIA CAPABILITIES WITH CIRCUIT-SWITCHED CALLS

This application is a Continuation of U.S. patent application Ser. No. 09/960,554, entitled INTEGRATING MULTIMEDIA CAPABILITIES WITH CIRCUIT-SWITCHED CALLS, filed Sep. 21, 2001, currently pending, the disclosure of which is hereby incorporated by reference in its entirety.

This application also claims the benefit of Provisional Application Ser. No. 60/308,177, filed Jul. 27, 2001, the disclosure of which is incorporated herein by reference.

FIELD OF THE INVENTION

The present invention relates to multimedia communications, and in particular, relates to integrating multimedia capabilities with circuit-switched calls.

BACKGROUND OF THE INVENTION

The acceptance of network applications and the Internet has given rise for a need to associate voice communications with various network-based applications and functions. While engaged in a telephone conference, users often share applications, such as whiteboarding applications, and web pages to enhance communications. In most instances, users initiate the voice call and then establish an application sharing arrangement independently of the voice call.

Numerous software packages have attempted to integrate voice and data communications over packet-switched networks. Unfortunately, the availability of quality packet-based voice systems is low while the circuit-switched voice systems are widely available. As such, attempts have been made to associate circuit-switched voice calls with packet-switched multimedia applications.

Previous attempts to integrate circuit switched voice calls and multimedia sessions have required proprietary protocols or cumbersome protocols, such as H.323. The lack of flexibility and complexity of these protocols have suppressed their acceptance and availability. Accordingly, there is a need for an efficient and easy to implement technique for integrating circuit-switched voice calls and packet-switched multimedia capability. Further, there is a need to provide such integration without requiring proprietary protocols and by using accepted standards that are readily available.

SUMMARY OF THE INVENTION

The present invention monitors call signaling events stemming from a circuit-switched call between a caller and a called party and controls a packet-session between user agents on respective endpoints associated with the caller and called party. The endpoints may include any type of computational device capable of facilitating the packet-session over a packet-switched network. Control of the user agents may be provided via a proxy for the user agents and may use the session initiation protocol (SIP), or like session control protocol for communications.

Directory numbers for the circuit-switched, customer premise equipment supporting the circuit-switched call may be associated with communication addresses for the endpoints. During operation, the directory numbers for the calling and called party are used to identify the addresses of the respective endpoints. When a circuit-switched call is initiated or established, a call signaling trigger is identified, and the packet session is established between the user agents of the endpoints. Upon completion of the circuit-switched call, a corresponding call signaling trigger is identified, and the packet session is ended.

A dedicated integration service may be used to facilitate interaction with the circuit switched network to identify call-signaling events and cooperate with a proxy to control the packet session between the user agents. Alternatively, the integration service may be combined with the proxy alone, or with other network devices.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
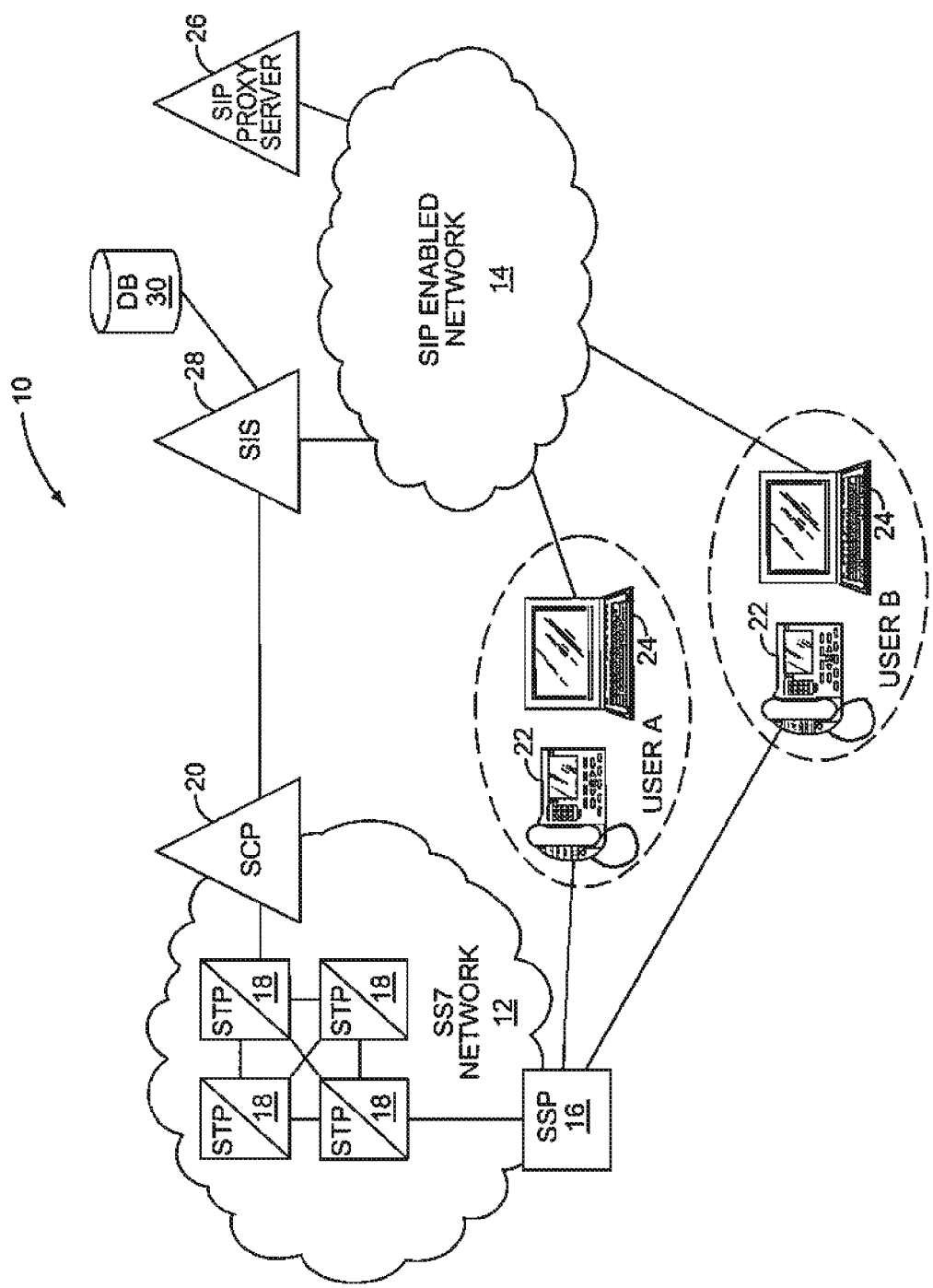
FIG. 1 is an illustration of a communication environment according to one embodiment of the present invention.

With reference to FIG. 1, an exemplary communication environment 10 capable of carrying out the concepts of the present invention is illustrated. The communication environment 10 is depicted as including a system signaling 7 (SS7) network and a session initiation protocol (SIP) enabled packet switched network 14. The SIP enabled network 14 may include any type of packet-switched network having devices using SIP to facilitate communications between two or more devices.

The SS7 network 12 is an advanced intelligent network (AIN) capable of providing call signaling for voice-based communications over the public switched telephone network (PSTN) and well known services such as toll-free dialing, automatic redial, call back, and calling number delivery (caller ID). The primary components of a typical SS7 network 12 include service switching points (SSP) 16, service transfer points (STP) 18, and service control points (SCP) 20.

A typical SSP 16, such as Nortel Networks Limited's DMS100, provides standard voice switching and is equipped with SS7 hardware, software, and signaling links. The SSPs 16 are the "end-points" of an SS7 network and typically reside between the customer premise equipment 22 and the SS7 network 12. SSPs 16 also typically provide the end-toend circuit for the voice transport and perform most of the basic call processing required to setup and terminate voice calls.

The STPs 18 are typically reliable, high-speed packet switches that route SS7 signaling messages throughout the SS7 network 12. The SCPs 20 are computing platforms that run applications providing enhanced service logic to default call processing actions of the SSPs 16, depending on the application. Those skilled in the art will have an appreciation and understanding of the SS7 network 12 and like signaling networks.

Using AIN concepts, the SSPs 16 will temporarily halt call processing for certain events or points during a call and send information relating to the events to the SCP 20. The SCP 20 will either continue call processing or perform an action, such as release, redirect, or terminate the call. As such, the SCP 20 is routinely engaged in call processing and has information pertaining to the call being process and events taking place during such processing. The present invention provides a mechanism for the SIP network 14 to interact with the SCP 20 to identify events during call processing as well as influence call processing as desired.

The Internet Engineering Task Force's RFC 2543, which is incorporated in its entirety by reference, provides the ability to establish sessions between endpoints 24 over a packet switched network, such as the SIP network 14, running the internet protocol (IP). Once established, these sessions can exchange media capabilities and set up multiple media paths between the endpoints 24 based on their capabilities. A SIP endpoint 24 will support a User Agent (UA).

User Agents register their ability to receive calls with a SIP proxy server 26 by sending "REGISTER" messages to the SIP proxy server 26. The "REGISTER" message informs the SIP proxy server 26 of the SIP uniform resource locator (URL), which identifies the User Agent to the network. The "REGISTER" message also contains information about how to reach the specific User Agent over the SIP network 14. For instance, the "REGISTER" message may provide the User Agent's IP address and port in which the User Agent will monitor or facilitate communications.

Typically, when a User Agent wants to initiate a call to another User Agent, it will send an "INVITE" message to the SIP proxy server 26 specifying the targeted User Agent in the "TO" header. Identification of a User Agent takes the form of a SIP URL, <username>@<domain>, such as janedoe@nortelnetworks.com. The SIP proxy server 26 will use the SIP URL in the "TO" header of the message to determine if the User Agent is registered. The username is usually unique within the namespace of the specified domain.

If the targeted User Agent has registered, the SIP proxy server 26 will forward the "INVITE" message directly to the targeted User Agent. The User Agent responds with a 200 OK message to the originating User Agent via the SIP proxy server 26, and a session between the two User Agents will be established as per the message exchange required in the SIP specification. Capabilities are passed between the two User Agents as parameters embedded within the session setup messages such as INVITE, 200 OK, and ACK. Media capabilities can also be exchanged using the SIP "INFO" message. Capabilities are typically described using the Session Description Protocol (SDP). Once User Agents are in an active session with each other and understand each other's capabilities, the respective endpoints 24 providing the User Agents can exchange the specified media content.

Reference is made to the Internet Engineering Task Force draft "draft-rosenberg-sip-3pcc-00.ext" for SIP third party call control, which is outlined below.

Third party call control may take the following form. A central controller first calls one of the participants, A, and presents the INVITE message without any media. When this call is complete, the controller has the SDP needed to communicate with A. The controller then uses the SDP to initiate a call to participant B. When this call is completed, the controller has the SDP needed to communicate with B. This information is then passed to A. The result is that there is a call leg between the controller and A, a call leg between the controller and B, but media between A and B.

In the preferred embodiment of the invention, an application server is configured to interact with the SS7 network 12 or like circuit switched network via the SCP 20. The application server is generally referred to herein as a "SIP Integration Server" or SIS 28, which monitors call events from the SS7 network 12 and performs third party call control between the Calling and Called User Agents on the SIP network based on those events. The SIS 28 may be affiliated with a database 30 to provide information for operation and pertaining to the directory numbers, addresses and the like for User Agents and CPEs 22.

Figure 2:
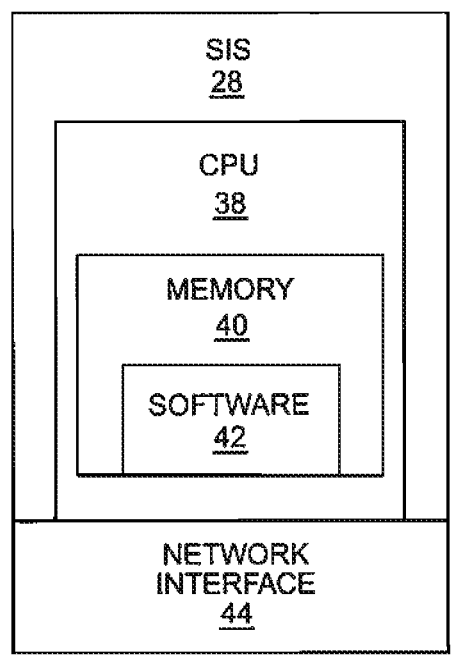
FIG. 2 is a block representation of a SIP integration server according to one embodiment of the present invention.

As shown in FIG. 2, the SIS 28 may be a typical web server having a central processing unit (CPU) 38 with the requisite memory 40 containing the software and data necessary for operation. The CPU 38 is associated with a network interface 44 facilitating communications with other devices, such as the endpoints 24, SIP proxy server 26, SCP 20, and the database 30 through any number of local area networks, routers, switches and hubs in traditional fashion.

Subscribers to the SIS 28 will have certain AIN triggers provisioned against their directory number for the CPE 22 within their local SSP 16. The triggers correspond to events during call processing. Whenever the subscriber is involved with a telephone call, the SSP 16 will route the appropriate triggers to the SIS service for interpretation. It should be noted that this disclosure is not tied to the mechanism by which AIN messages are routed to the SIS 28. In addition, SIS subscribers will have User Agents installed on their personal computer or other computing device that has access to the SIP network 14. These User Agents can be any SIP enabled applications that know how to register with the SIP proxy server 26, can establish SIP sessions, and can exchange multi-media content of one or more types. For another example of a SIP user agent benefiting from the present invention, please refer to U.S. patent application Ser. No. 09/666,583, filed Sep. 21, 2001, entitled "AUTOMATED WEB BROWSER SYNCHRONIZATION," the disclosure of which is incorporated herein by reference.

SIP User Agents register with the SIP proxy server 26 as specified in the SIP specification and preferably identify their username in the SIP URL to be equivalent to the directory number that is assigned to their telephone. For example if John Smith has a directory number of (555) 991-1234, then John's SIP User Agent would register with the username of <5559911234>@<domain> with the SIP proxy server 26. Such registration is preferred because the directory numbers are the main identifier used within the AIN triggers received by the SIS 28 from the SSP 16.

When the SIS 28 needs to interact with the SIP network 14, it will send SIP messages to the SIP proxy server 26 and identify the intended recipient of the message using the corresponding directory number. The SIP proxy server 26 will forward the message to the appropriate User Agent. Notably, this disclosure depicts the SIP Integration Server and the SIP Proxy as two separate entities; however, the functionality of both may reside within the same platform or even within the same application. Thus, the concepts of the present invention may be implemented with the proxy functionality embedded within the SIS 28, and vice versa.

A SIP session is initiated when the SU receives a trigger from the SCP 20 that the voice call for its user has been answered. On receiving this trigger from the SCP 20, the SIS 28 first attempts to establish a SIP session with the caller's User Agent without specifying any media capabilities. The caller's User Agent accepts the session invitation and will respond with its capability descriptions. The SIS 28 then attempts to establish a session with the called user's User Agent and sends the capabilities of the caller's User Agent. The called User Agent accepts the session invitation and responds with its own capability descriptions. The SIS 28 then forwards the called User Agents capability descriptions back to the caller's User Agent to complete the capability negotiations, and the two User Agents begin exchanging content on their established media path(s).

The SIP Session is terminated whenever the SIS 28 receives a Disconnect trigger from the SCP 20 indicating that either side has released the voice call. Once this notification is received, the SIS 28 sends a SIP BYE message to both User Agents and the SIP Session is terminated.

Figure 3A:
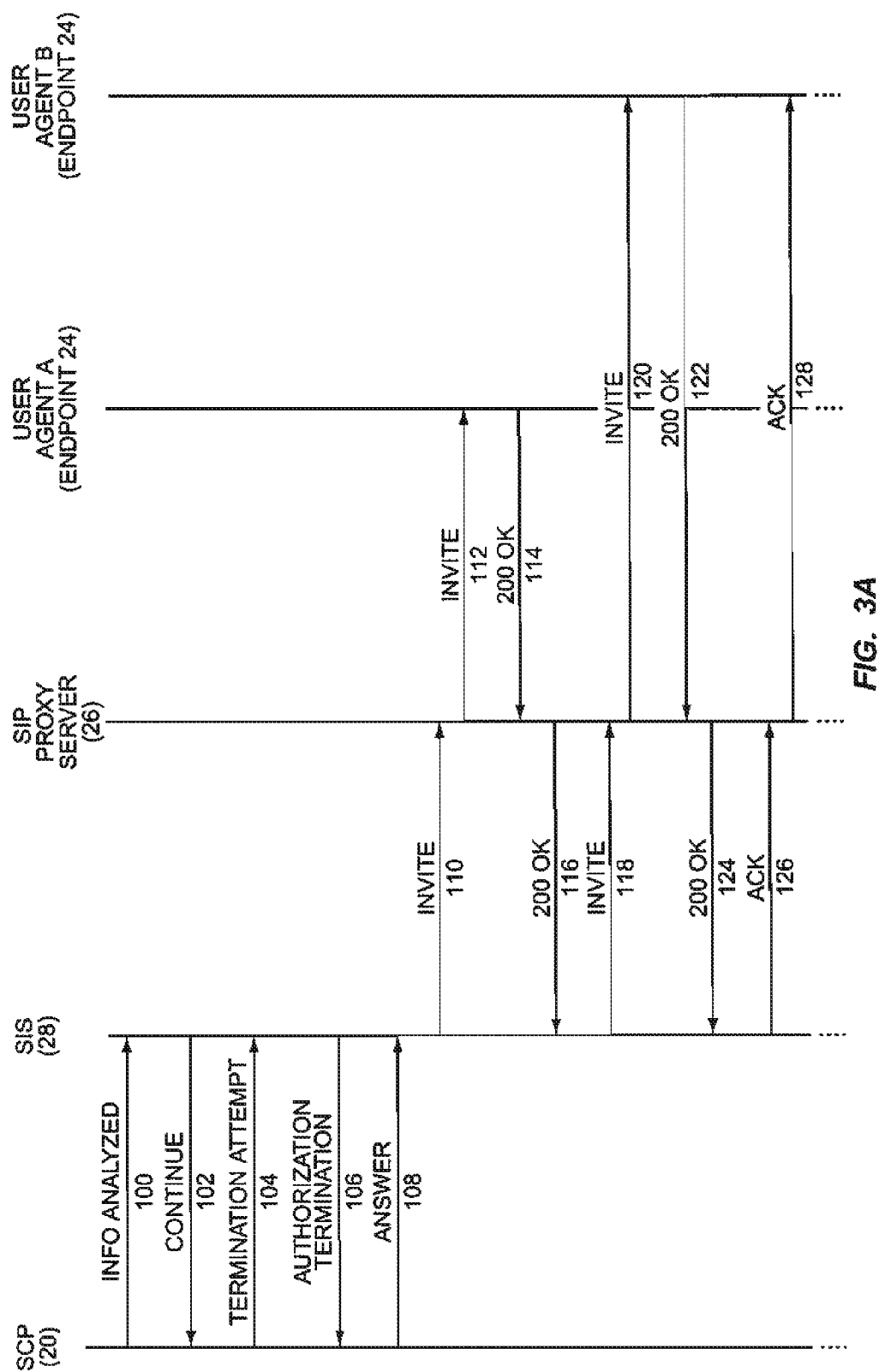
FIGS. 3A and 3B are an exemplary communication flow according one embodiment of the present invention.
Figure 3B:
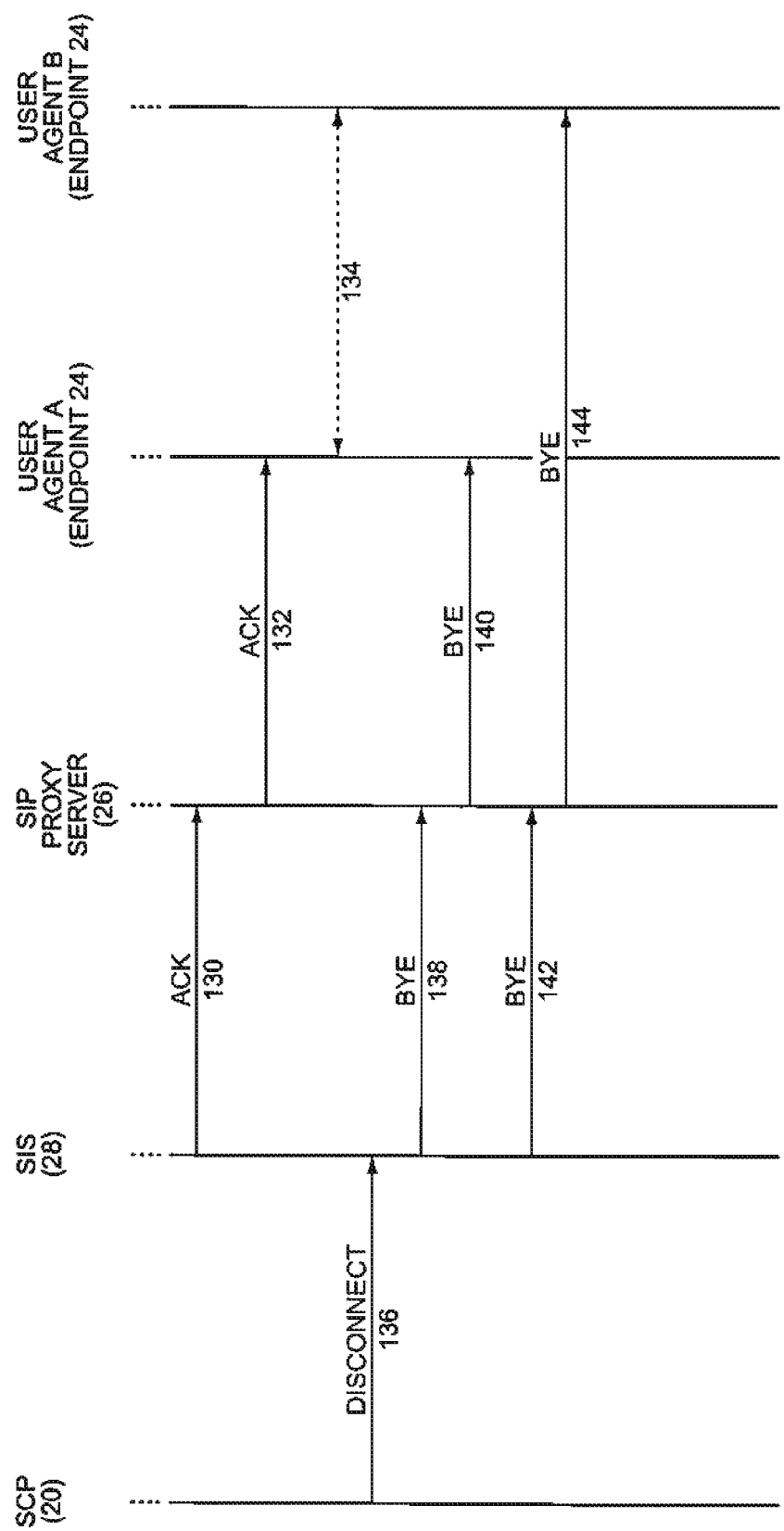

Turning now to FIGS. 3A and 3B, an exemplary communication flow is described for setting up and releasing calls using the SIS 28 to synchronize SIP multi-media sessions with voice calls. Those skilled in the art will recognize the exemplary communication flow highlights only some of the applications made possible by the present invention. The concepts and architecture of the present invention allow for numerous service extensions, which should become apparent to those skilled in the art upon reading this disclosure.

For the exemplary flow of FIGS. 3A and 3B, User A places a call to User B and a SIP Session is established with multi-media capability, such as whiteboarding or application sharing. Assume User A has a telephone number of (555) 444-1111 and a SIP User Agent A application running on an associated personal computer (endpoint 24) that supports whiteboarding. Further assume that User Agent A has previously registered with the SIP proxy server 26 as 5554441111@<service_provider_domain>. User B has a telephone number of (555) 333-2222 and a SIP User Agent B application running on his/her personal computer that also supports whiteboarding. The User Agent for User B has previously registered with the SIP proxy server 26 as 555333222@<service_provider_domain>.

Initially, User A uses his CPE 22 (i.e., telephone) to place a call to User B by dialing 333-2222. User A's SSP 16 sends an InfoAnalyzed AIN trigger to the SCP 20 servicing the SIS 28. The InfoAnalyzed trigger contains both the directory number of the calling user (User A) and the directory number of the called user (User B). The SCP 20 forwards the InfoAnalyzed trigger to the SIS 28 (step 100). The SIS 28 looks up the subscriber profile for User A on database 30 by indexing on the calling user's (User A's) directory number. The SIS 28 finds the profile for User A and maintains the knowledge that User A is placing a call to User B.

The SIS 28 replies to the SCP with a Continue response thus allowing the SSP 16 to continue to setup the call to User B's CPE 22 (step 102). The SSP 16 servicing User B's CPE 22 sends a TerminationAttempt trigger to the SCP 20, which forwards it on to the SIS 28 (step 104). The SIS 28 looks up the subscriber profile for User B by indexing on the called user's (User B) directory number. The SIS 28 finds the profile for User B and maintains the knowledge that User A is placing a call to User B.

The SIS 28 replies by sending an AuthorizeTermination response back to the SSP 16 via the SCP 20 (step 106). The SSP 16 terminates the call to User B's CPE 22, which begins to ring. User B answers the call by lifting the handset of the respective CPE 22. The SSP 16 servicing User B's CPE 22 sends an Answer trigger to the SIS 28 via the SCP 20 (step 108). The SIS 28 now knows that the voice call between User A and User B has been answered.

To set up an associated SIP session, the SIS 28 establishes a session with the caller's (User A) User Agent first. To do this, the SIS 28 sends an "INVITE" message to the SIP proxy server 26 with the username in the TO: field set to the telephone number of User A—(5554441111@<service_provider_domain>) (step 110). This initial INVITE message typically does not contain any capability information. The SIP proxy server 26 forwards the message on to the User Agent on endpoint 24 for User A (step 112).

User A's User Agent replies with a 200 OK message and specifies it's capability information, such as media type and coding/decoding (CODEC) support, in the message body (step 114). The SIP proxy server 26 forwards the 200 OK back to the SIS 28 (step 116).

The SIS 28 sends an "INVITE" message to the SIP proxy server 26 with the username of the TO: field set to the telephone number of User B (555333222@<service_provider_domain>) (step 118). Also included in this message is the capability description received in the 200 OK message from the caller's (User A) User Agent. The SIP proxy server 26 forwards the message on to the User Agent on endpoint 24 for User B (step 120).

The User Agent for User B replies with a 200 OK message and specifies its capability information in the message body (step 122). The SIP proxy server 26 forwards the 200 OK response back to the SIS 28 (step 124). The SIS 28 acknowledges the 200 OK response from the User Agent of User B by sending an ACK message to User Agent for User B via the SIP proxy server 26 (steps 126 and 128).

The SIS 28 now needs to send the capability information it received from User B's User Agent to User A's User Agent. Accordingly, the SIS 28 builds an ACK message with the capability description received from the 200 OK message from User Agent of User B and sends the ACK message to User A's User Agent via the SIP proxy server 26 (steps 130 and 132). Media capability information could also have been sent in a second "INVITE" message as opposed to the ACK as described in association with the Third Party Call Control IETF draft discussed above.

A SIP session is now set up between the User Agents for User A and User B, thus allowing users to perform the multimedia function(s) as described within the session description of the message body. When either user ends the voice call by hanging up their handset of the CPE 22, the SCP 20 will send an appropriate Disconnect trigger to the SIS 28 (step 136). The SIS 28 will terminate the SIP Session by sending "BYE" messages to each User Agent via the SIP proxy server 26 (steps 138 through 144).

Those skilled in the art will recognize improvements and modifications to the preferred embodiments of the present invention. All such improvements and modifications are considered within the scope of the concepts disclosed herein and the claims that follow.

What is claimed is:

1. A method for integrating separate circuit-switched voice and packet-switched data sessions, comprising:
   a. receiving notification of at least one call signaling event for a separate circuit-switched call between a caller and a called party over a circuit-switched network; and
   b. controlling a separate packet-switched session for a packet-session between a caller user agent for a caller endpoint and a called party user agent on a called party endpoint based on at least one of the call signaling events for the separate circuit-switched call, wherein the caller and called party are associated with the caller and called party endpoints, such that the caller and called party may conduct concurrent voice and data sessions.

2. The method of claim 1, wherein the controlling step comprises communicating with the caller and called party user agents via at least one proxy for at least one of the caller user agent, and called party user agent.

3. The method of claim 1, wherein the caller and the called party are registered with at least one proxy using directory numbers associated with the caller and the called party respectively.

4. The method of claim 1, wherein the controlling step is effected using session initiation protocol (SIP).

5. The method of claim 1, wherein the packet-session is a SIP session.

6. The method of claim 1, wherein the receiving notification step comprises monitoring triggers corresponding to the call signaling events provided by a call signaling control system in the circuit-switched network.

7. The method of claim 1, further comprising: a. identifying directory numbers for the caller and called party; and b. determining addresses of the caller and called party user agents to use for the packet-session based on the directory numbers.

8. The method of claim 7, wherein the addresses for the caller and called party user agents include uniform resource locators corresponding to the directory numbers for the caller and called party.

9. The method of claim 1, wherein:
a. the receiving notification step comprises receiving notification of a call signaling trigger representing initiation or establishment of the circuit-switched call between the caller and the called party; and
b. the controlling step comprises initiating the packet-session between the caller user agent and the called party user agent upon identifying the call signaling trigger representing the initiation or establishment of the circuit-switched call between the caller and the called party.

10. The method of claim 1 wherein:
a. the receiving notification step further comprises receiving notification of a call signaling trigger representing completion of the circuit-switched call between the caller and the called party; and
b. the controlling step comprises ending the packet-session between the caller user agent and the called party user agent upon identifying the call signaling trigger representing completion of the circuit-switched call between the caller and the called party.

11. The method of claim 1 wherein communications with the caller and called party user agents are facilitated using session initiation protocol (SIP) via a SIP proxy for the caller and called party user agents and:
a. the receiving notification step comprises:
  i. receiving notification of a call signaling trigger representing initiation or establishment of the circuit-switched call between the caller and the called party; and
  ii. receiving notification of a call signaling trigger representing completion of the circuit-switched call between the caller and the called party; and
b. the controlling step comprises:
  i. initiating the packet-session between the caller user agent and the called party user agent upon identifying the call signaling trigger representing initiation or establishment of the circuit-switched call between the caller and the called party; and
  ii. ending the packet-session between the caller user agent and the called party user agent upon identifying the call signaling trigger representing completion of the circuit-switched call between the caller and the called party.

12. A SIP integration server, comprising:
at least one processor;
at least one memory device storing instructions executable by the at least one processor to:
  a. receive notification of at least one call signaling event for a separate circuit-switched call between a caller and a called party over a circuit-switched network; and
  b. control a separate packet-switched session for a packet-session between a caller user agent for a caller endpoint and a called party user agent on a called party endpoint based on at least one of the call signaling events for the separate circuit-switched call, wherein the caller and called party are associated with the caller and called party endpoints, such that the caller and called party may conduct concurrent voice and data sessions.

13. The SIP integration server of claim 12, wherein the instructions executable to control a separate packet-switched session comprises instructions executable to communicate with the caller and called party user agents via at least one proxy for at least one of the caller user agent and called party user agent.

14. The SIP integration server of claim 12, wherein the caller and the called party are registered with at least one proxy using directory numbers associated with the caller and the called party respectively.

15. The SIP integration server of claim 12, wherein the instructions executable to control a separate packet-switched session use session initiation protocol (SIP).

16. The SIP integration server of claim 12, wherein the packet-session is a SIP session.

17. The SIP integration server of claim 12, wherein the instructions executable to receive notification step comprises instructions executable to monitor triggers corresponding to the call signaling events provided by a call signaling control system in the circuit-switched network.

18. The SIP integration server of claim 12, further comprising:
a. instructions executable to identify directory numbers for the caller and called party; and
b. instructions executable to determine addresses of the caller and called party user agents to use for the packet-session based on the directory numbers.

19. The SIP integration server of claim 18, wherein the addresses for the caller and called party user agents include uniform resource locators corresponding to the directory numbers for the caller and called party.

20. The SIP integration server of claim 12, wherein:
a. the instructions executable to receive notification step comprise instructions executable to receive notification of a call signaling trigger representing initiation or establishment of the circuit-switched call between the caller and the called party; and
b. the instructions executable to control a separate packet-switched session comprise instructions executable to initiate the packet-session between the caller user agent and the called party user agent upon identifying the call signaling trigger representing the initiation or establishment of the circuit-switched call between the caller and the called party.

21. The SIP integration server of claim 12, wherein:
   a. the instructions executable to receive notification further comprise instructions executable to receive notification of a call signaling trigger representing completion of the circuit-switched call between the caller and the called party; and
   b. the instructions executable to control a separate packet-switched session comprise instructions executable to end the packet-session between the caller user agent and the called party user agent upon identifying the call signaling trigger representing completion of the circuit-switched call between the caller and the called party.

22. The SIP integration server of claim 12, wherein communications with the caller and called party user agents are facilitated using session initiation protocol (SIP) via a SIP proxy for the caller and called party user agents and:
   a. the instructions executable to receive notification comprise:
      i. instructions executable to receive notification of a call signaling trigger representing initiation or establishment of the circuit-switched call between the caller and the called party; and
      ii. instructions executable to receive notification of a call signaling trigger representing completion of the circuit-switched call between the caller and the called party; and
   b. the instructions executable to control a separate packet-switched session comprise instructions executable to:
      i. initiate the packet-session between the caller user agent and the called party user agent upon identifying the call signaling trigger representing initiation or establishment of the circuit-switched call between the caller and the called party; and
      ii. end the packet-session between the caller user agent and the called party user agent upon identifying the call signaling trigger representing completion of the circuit-switched call between the caller and the called party.

23. A system for integrating separate circuit-switched voice and packet-switched data sessions, comprising:
   a signaling control point operable to transmit a trigger when a calling user connected to a called user by a circuit-switched call handled by the signaling control point indicates interest in establishing a packet-switched data session with the called user; and
   a SIP integration server operable, in response to the trigger, to exchange messages with user agents of the calling user and the called user to establish the packet-switched data session.

24. The system of claim 23, wherein the SIP integration server is operable to exchange messages with the user agents which specify capabilities of the user agents to establish the packet-switched data session.

25. The system of claim 24, wherein the SIP integration server is operable to exchange messages with the user agents by:
   sending at least one invite message to the user agent of the called user;
   receiving at least one response message from the user agent of the called user, the response message specifying capabilities of the user agent of the called user; and
   sending at least one message to the user agent of the calling user specifying capabilities of the user agent of the called user.

26. The system of claim 23, wherein:
   the signaling control point is operable to send a message to the SIP integration server when either the calling user or the called user terminates the circuit-switched call; and
   the SIP integration server is operable to terminate the packet-switched data session between the calling user and the called user on receipt of the message indicating termination of the circuit-switched call.

27. The system of claim 23, further comprising at least one SIP Proxy for coupling between the SIP integration server and the user agents, the at least one proxy mediating communications between the SIP integration server and the user agents.

28. The system of claim 27, wherein the at least one SIP Proxy and the SIP integration server are integrated in a common server.

29. A method for integrating separate circuit-switched voice and packet-switched data sessions, the method comprising:
   operating a signaling control point to transmit a trigger when as calling user connected to a called user by a circuit-switched call handled by the signaling control point indicates interest in establishing a packet-switched data session with the called user; and
   operating a SIP integration server, in response to the trigger, to exchange messages with user agents of the calling user and the called user to establish the packet-switched data session.

30. The method of claim 29, comprising operating the SIP integration server to exchange messages with the user agents which specify capabilities of the user agents to establish the packet-switched data session.

31. The method of claim 30, comprising operating the SIP integration server to exchange messages with the user agents by:
   sending at least one invite message to the user agent of the called user;
   receiving at least one response message from the user agent of the called user, the response message specifying capabilities of the user agent of the called user; and
   sending at least one message to the user agent of the calling user specifying capabilities of the user agent of the called user.

32. The method of claim 29, comprising:
   operating the signaling control point to send a message to the SIP integration server when either the calling user or the called user terminates the circuit switched call; and
   operating the SIP integration server to terminate the packet-switched data session between the calling user and the called user on receipt of the message indicating termination of the circuit-switched call.

33. The method of claim 29, further comprising coupling at least one SIP Proxy between the SIP integration server and the user agents, and operating the at least one proxy to mediate communications between the SIP integration server and the user agents.

34. The method of claim 33, wherein the at least one SIP Proxy and the SIP integration server are integrated in a common server.

* * * * *

UNITED STATES PATENT AND TRADEMARK OFFICE
CERTIFICATE OF CORRECTION

PATENT NO. : 8,711,707 B2  
APPLICATION NO. : 13/323207  
DATED : April 29, 2014  
INVENTOR(S) : Christopher G. Ramsayer et al.

Page 1 of 1

It is certified that error appears in the above-identified patent and that said Letters Patent is hereby corrected as shown below:

In the Claims:

Claim 29, Column 10, Line 24, delete "when as calling" and substitute -- when a calling --

Signed and Sealed this  
Fifth Day of August, 2014

Michelle K. Lee  
*Deputy Director of the United States Patent and Trademark Office*